United States Patent Office 3,151,058
Patented Sept. 29, 1964

3,151,058
ARTIFICIALLY POISONING CATALYSTS
Henry Erickson, Park Forest, Ill., assignor, by mesne assignments, to Sinclair Research, Inc., New York, N.Y., a corporation of Delaware
No Drawing. Filed Sept. 28, 1959, Ser. No. 842,563
17 Claims. (Cl. 208—113)

This invention pertains to the treatment of catalysts suitable for study in determining the catalyst contaminating effects of minute amounts of metals contained in mineral oil cracking stocks. In copending application Serial No. 705,511, filed December 27, 1957, now abandoned, a method is described which comprises depositing a metal poison on a silica-based catalyst from a solution of a chelate of the metal. The present invention is drawn to a method by which these artificially poisoned catalysts are made to resemble naturally poisoned catalysts even more closely in their behavior. The process of this invention includes treating the chelate-poisoned catalyst with steam for about 1 to 10 hours or more at a temperature of from about 750 to 1250° F.

In the aforementioned copending application it was pointed out that one of the most important phases of study in the improvement of catalyst performance is in the area of metals poisoning. Various petroleum stocks have been known to contain at least traces of a wide spectrum of metal compounds which, when present in a cracking stock, deposit as non-volatile compounds on the catalyst during the cracking process, so that regeneration of the catalyst to remove coke does not remove these contaminants. Although referred to as "metals," the contaminants may be in the form of free metals or non-volatile metal compounds. The metals having atomic numbers from 23 to 30 are prevalent in many crude oils, and of these, iron, nickel, vanadium and copper, when deposited on a cracking catalyst, markedly alter the character and pattern of the cracking reactions. It is hypothesized that these metals when deposited on the surface of the cracking catalysts superimpose their dehydrogenation activity on the cracking reactions and convert into carbonaceous residue and gas some of the material that would ordinarily go into gasoline. This unwanted activity is especially great when nickel and vanadium are present in the feedstocks.

Laboratory work in the development of new catalyst compositions, for instance by the addition of new components to commercial catalysts, requires comparative testing of the compositions before and after poisoning. Also, the selection of the engineering techniques to be used with a new cracking feedstock is determined by the type of side reactions likely to occur when the catalyst is poisoned with the metals contained in such feedstocks. Subjecting new catalysts and new feedstocks to pilot plant operations has been the only method known, before the invention of the above-mentioned copending application, for obtaining catalysts poisoned in a manner which resembles the manner in which they are poisoned in actual commercial plant operation. The process of that invention is effective in depositing the metals or compounds of the metals with atomic numbers from 23 to 30. Included in this range of metals are the metals most frequently encountered in oil field stocks and the metals which the crude oil is most likely to pick up on its way from the field to the refinery. Of these metals, as mentioned above, nickel and vanadium are the most intensively studied in the laboratory because their poisoning effects are so great and they are so prevalent.

This invention provides catalytic materials which are particularly adapted to overcome the above-mentioned problems. I have found that metals-poisoning of silica-based cracking catalysts as experienced in cracking metal-contaminated hydrocarbons can be more closely emulated by including in the catalyst a metal of atomic number of from 23 to 30 through contact of the catalyst with a solution of a decomposable organic oxygen-containing chelate of the metal and subjecting the impregnated catalyst to an elevated temperature to decompose the chelate. The catalyst is then treated with steam for about 1 to 10 hours or more at a temperature of about 750 to 1250° F. The invention also includes the testing of such catalysts in the cracking of hydrocarbons.

In cracking the feedstock is usually a mineral oil or petroleum hydrocarbon fraction such as straight run and recycle gas oils or other normally liquid hydrocarbons, most frequently boiling above the gasoline range. Cracking is ordinarily effected to produce gasoline as the most valuable product and is generally conducted at temperatures of about 750 to 1050° F., at pressures up to 2000 p.s.i.g., preferably about atmospheric to 100 p.s.i.g., and without substantial addition of free hydrogen to the system. If desired the analysis of the products from use of the contaminated or metals-impregnated catalyst can be compared with the analysis of the products from the use of similar but uncontaminated catalysts to determine the effect of metals-poisoning on the catalyst. The method permits study of the effect of a single poisoning metal on the silica-based cracking catalyst even though a combination of metals, e.g. nickel and vanadium, can be employed. The addition and study of a single poisoning metal by commercial or pilot plant cracking is impractical, if not impossible, as available cracking stocks do not have only a single metal-contaminant.

To poison a catalyst according to my process a cracking catalyst is impregnated with a solution of a metal chelate; dried; calcined at an elevated temperature in order to evaporate the solvent, decompose the chelate and volatilize the decomposition products; and steam treated to put the catalyst into an activity state substantially similar to a freshly regenerated catalyst which has been naturally poisoned.

The metal chelate solution is made by dissolving a suitable salt of the heavy metal, the poisoning effect of which is to be studied, in a suitable solvent, e.g. a polar solvent such as water. Suitable salts of all the metals with atomic numbers 23 to 30 are commercially available, although when the metal in question is contained in the anion, as in ammonium vanadate, the metal should be converted in the solution to its cationic form. This can be done, for example, by contacting the solution with a reducing agent such as hydrazine hydrate. The heavy metal is advantageously introduced into the solution as a salt of formic or other organic acid. The nitrate or other inorganic salt is suitable so long as it is soluble and does not unduly contribute to the poisoning effect by depositing on the catalyst. If an organic solvent is chosen, an organic salt is usually used.

To this salt solution is added a suitable amount of a chelating agent which is soluble in the solvent chosen. Chelating agents belong to a class of materials known as "sequestrants." These are materials which have the ability to form non-ionic soluble complexes with molecular fragments which normally dissolve in a polar solvent in the form of ions. These materials, when added to an ionic solution, effectively "hide" ions of particular valence characteristics, preventing the sequestered ion from taking part in its normal ionic reactions.

Chelates are distinguishable from ordinary organo-metallic compounds in the fact that chelates contain the metal component in a ring structure which is formed not only by valence bonds but also by "residual" or "coordinate" bonds which are "donated" to the metal atom by unshared electrons of a neighboring atom. The donor atoms are restricted to strongly non-metallic elements of Groups V and VI. Of these, nitrogen, oxygen and sulfur are the only common examples. Commercially available sequestering agents are generally classified as organic or inorganic. The condensed polyphosphates are the most widely used of the inorganic sequestering agents. Of the organic sequestering agents, two groups are of economic importance: the amino acids, particularly polycarboxylic acids such as ethylene diamine tetra-acetic acid (EDTA) and the hydroxy carboxylic acids such as gluconic acid, citric acid and tartaric acid. Many of these organic materials are known which are effective to sequester heavy metals having atomic numbers from 23 to 30. These organic materials are known as "chelating agents" and the resulting metal-organic complexes are known as "chelates." The use of such chelates in preparing hydrocracking catalysts is described in U.S. Patent No. 2,889,287. The chelates employed in this invention contain oxygen in the molecule and frequently nitrogen as well, and the metal is attached to at least one oxygen atom by a valence bond or a coordinate bond and has a coordinate bond donated by either an oxygen or nitrogen atom. The cyclic compounds in which the metal is joined to two or more donor groups (such as the nitrogens in the structure shown above) of a single molecule or ion are particularly important, since they have exceptionally high stability.

It has been found in the study of metal chelates that each metal has a characteristic "coordination number" which is the total of its ordinary valence number plus the number of donor atoms with which it will associate to form its most stable complexes. Nickel, with a valence of +2, has a coordination number of 6. $Fe^{++}$ also has a coordination number of 6. $Cu^{++}$ has a coordination number of 4. Some known, stable nickel chelates are: $Ni^{II}$ (acetylacetonate)$_2$; $Ni^{II}$ (salicylaldehyde)$_2$; and $Ni^{II}$ (salicylaldehydeimine)$_2$. Vanadium bis-salicylaldehyde-d-(-) propylenediimine is also known.

The most popular chelating agent is ethylenediamine tetraacetic acid (EDTA). The sodium salt of this acid is commercially available under the trade names "Nullapon B," "Versene" and "Sequestrene A." Another commercial product known to be effective to chelate heavy metal ions is "Versenol" which is the trisodium salt of N-hydroxy-ethyl-ethylene diamine triacetic acid sold by the Bersworth Chemical Company of Framingham, Massachusetts.

Other natural and synthetic products are reported in the literature as effective to chelate heavy metal ions, such as palacatonic acid and palconic acid (61 Chem. & Eng. News, No. 13, Inventory Issue, 1954, p. 118); triethanolamine in alkaline solutions (U.S. Patent No. 2,544,649); polyethylene polyamino acids such as triethylene tetraamine tetraacetic acid and its homolog amino acids (U.S. Patent No. 2,564,092); dextrin in an alkaline medium (U.S. Patent No. 2,678,303); certain epoxyamino acetic acid salts (U.S. Patent No. 2,712,544); amino derivatives of N-alkyl substituted aspartic acids and their functional derivatives (U.S. Patent No. 2,761,874); and tri-ammonium salts of mono-isopropanol ethylene diamine triacetic acid (U.S. Patent No. 2,808,435).

All of the above-mentioned chelating agents are water-soluble, at least at alkaline pH ratings, and are suitable, as are others of this class, for making the stable heavy metal chelate complexes required by the invention. In addition, sequestering agents such as acetylacetone are known which are soluble in ethyl alcohol or other polar organic solvents which contain oxygen.

A solution of the chelate can be made by dissolving a chelating agent or its salt, if the agent is of limited solubility. The salt used is preferably the ammonium salt in order not to introduce ash-forming alkali metals into the solution. Either the chelating agent or the metal salt may be dissolved first in the solution, but when the salt contains a metal in cationic form it is preferred to make the chelate solution first, since the metal salt will dissolve more readily in a chelate solution than in a pure solvent. It is usually important that the resulting solution of the metal chelate contain no poisoning constituents, in cationic, anionic or undissociated form, other than the metal or group of metals selected for study. Sodium and other alkaline metals are especially detrimental. It is preferred that the solution contain the metal chelate as its sole non-volatile constituent. For this reason it is preferred to use the free acid form of the chelating agent.

The cracking catalysts which have received the widest acceptance today are usually predominantly silica, that is silica-based, and may contain solid acidic oxide promoters, e.g. alumina, magnesia, etc., with the promoters being usually less than about 35% of the catalyst, preferably about 5 to 25%. These compositions are in a state of very slight hydration. The catalysts are susceptible to natural poisoning in a cracking process and also to artificial poisoning according to the process of this invention. The catalysts may also contain small amounts of other materials such as non-volatile oxides, but current practice in catalytic cracking leans more toward the exclusion of foreign materials from the silica-alumina or silica-magnesia hydrate materials.

Aluminum silicates are silica-based materials used as cracking catalysts and may be produced either from natural clays by activation or by purely synthetic methods. The activation of natural clays, mostly of the montmorillonite type, is carried out by treatment with dilute acids, which remove excess alumina and oxides of calcium, iron, etc., and thus enrich the content of silica. Not only clays but also other aluminum silicates, such as zeolites, feldspar, etc., are activated for use as cracking catalysts.

The production of synthetic catalysts can be performed, for instance (1) by impregnating silica with aluminum salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by the combination of hydrated silica with other hydrate bases as, for instance magnesia, zirconia, etc.

The preferred method of impregnating the catalyst with poison consists of mixing with a quantity of chelate solution enough silica-based catalyst to absorb all of the solution. In practice, equal quantities of catalyst can be added to equal volumes of solutions, where each volume of solution contains the same solvent and a different concentration of chelate, to produce samples having varying levels of poisoning. The calcining temperature is generally in the range of 700 to 1300° F.

The catalysts poisoned according to the process of copending application Serial No. 705,511 have been found, in general, to simulate the behavior of catalysts which have been poisoned to the same level of metals content by actual use in a cracking process where the cracking feed contains these metal impurities. In catalytic cracking activity test units, for instance, it was found that chelate poisoned and naturally poisoned catalysts having the same metals content are almost equal in their gasoline factors at certain levels of conversion. The gas factors and, most importantly, the coke factors for a chelate-poisoned catalyst are closer to these factors for a naturally poisoned catalyst than are the gas and coke factors when a catalyst is poisoned by metal salt deposition to the same metals content.

For example, Table I, below shows the results obtained when a naturally nickel-poisoned catalyst and a catalyst poisoned to about the same nickel level with a chelate solution were used in a midget fluidized catalytic cracker.

TABLE I

*Yield Summary—60 Vol. Percent Conversion*

|  | Base, 273 p.p.m. NiO | Middle Poisoning Level | | High Poisoning Level | |
|---|---|---|---|---|---|
|  |  | Natural, 646 p.p.m. NiO | Chelate, 680 p.p.m. NiO | Natural, 911 p.p.m. NiO | Chelate, 944 p.p.m. NiO |
| Coke, Wt. Percent | 5.2 | 8.7 | 9.7 | 14.0 | 11.8 |
| C₃⁻, Wt. Percent | 6.5 | 8.0 | 7.5 | 8.0 | 7.6 |
| C₄'s, Vol. Percent | 13.7 | 11.7 | 11.7 | 10.2 | 10.8 |
| C₅⁻ EP, Vol. Percent | 46.3 | 40.7 | 40.2 | 36.1 | 28.6 |

It has been discovered that a treatment of the chelate poisoned catalyst with steam at an elevated temperature will give the catalyst gas and coke factors approaching and sometimes even equaling, within the limits of experimental error, these factors in a catalyst naturally poisoned to the same metals content.

The method of this invention comprises depositing on a silica-based catalyst a contaminant containing a metal having an atomic number from 23 to 30 by impregnating the catalyst with a solution containing a decomposable organic oxygen-containing chelate of the metal, subjecting the impregnated catalyst to an elevated temperature generally in the range of 700 to 1300° F. to dry the catalyst and decompose the chelate and then subjecting the catalyst to steam at a temperature of about 750 to 1250° F. for a period of about 1 to 10 hours or more. A temperature range of about 1000 to 1200° F. for about 4 to 8 hours is preferred. The pressure can be for instance one atmosphere.

The cracking zone for testing the catalytic material may constitute any desired type of catalytic cracking operation. Thus, the catalyst may be used as a fixed, moving or fluidized bed or may be in a more dispersed state. Typical cracking temperatures include about 750 to 1050° F. with the preferred temperature being from about 850 to 950° C. The pressure may vary from about atmospheric pressure to about 2,000 p.s.i.g. as previously noted. The catalytic agent may be regenerated intermittently or continously as desired in order to restore or maintain the activity of the catalyst. For typical operations, the catalytic cracking of the hydrocarbon feed would normally result in a conversion of about 50-60 percent of the feedstock into a product boiling in the gasoline boiling range. The preferred catalyst is silica-alumina but if desired silica-magnesia or silica gel promoted with small amounts of other metal oxides could be utilized. The catalyst of this invention may undergo other treatments, e.g. contact with steam after calcination, as long as the essential effect of the chelate addition is not unduly deleteriously modified.

Generally, the hydrocarbon petroleum oils utilized as feedstock for the cracking process may be of any desired type normally utilized in catalytic cracking operations. This feedstock may or may not contain metal contaminants such as vanadium, iron, cobalt or nickel.

In preparing my catalytic material sufficient of the chelate solution is added to provide in the final catalyst sufficient of the metal to give a poisoning effect on the cracking activity of the catalyst. Generally, the poisoning metals content of the catalyst will not exceed about 5000 parts per million and often each of the poisoning metals present will not be more than about 1000 to 1500 p.p.m., for instance, the nickel content may be about 100 to 500 p.p.m.

EXAMPLES

The catalyst selected was a mixture of two commercial silica-alumina cracking catalysts: one sulfuric acid activated bentonite; the other a sulfuric acid activated halloysite. The mixture contained roughly an equal quantity of each. Portions of this virgin catalyst were poisoned to two different levels of NiO+$V_2O_5$ by use in a pilot plant fluid unit to crack feedstocks containing nickel and vanadium. For use in a catalytic cracking activity test unit, two poisoned catalysts and a sample of the virgin catalyst were screened and the 80–200 mesh fractions utilized for testing. Approximately twenty pounds of 80–200 mesh base-line virgin catalyst were delivered for poisoning by the chelate method. Table II lists analyses obtained on the base-line catalyst (134), samples of the two pilot plant-poisoned catalysts (138 and 139) and two chelate-poisoned samples (144 and 146). Preparations of the two chelate-poisoned samples are detailed below:

The volatile content of sample 134 (base-line) was determined as 3.2%. 20 g. of this catalyst absorbed 11.27 ml. water. This volume completely saturated the catalyst with no excess. These values were used in calculating weights of salts and volumes for the chelate impregnating solutions.

Sample 144 was prepared by heating 2 liters of deionized water to boiling and adding 7.82 g. ethylene diamine tetraacetic acid (EDTA). Dilute (10%) $NH_4OH$ was slowly added until all of the EDTA had dissolved, approximately 15 ml. of the $NH_4OH$ being required. 4.70 g. nickel formate dihydrate ($Ni[CHO]_2 \cdot 2H_2O$) were added. This salt rapidly dissolved to form a brilliant dark blue solution. The solution was diluted to 2556 ml. with boiling deionized water. This solution was immediately added to 4536 g. (10 lbs.) of sample 134 and kneaded until homogeneous. The catalyst was uniformly wetted, without excess liquid. The product was dried for 24 hours at 110° C. and passed through a 20 mesh screen to break up any lumps.

About 30 ml. of 10% $NH_4OH$ were added to 2 liters of deionized water. Then 15.81 g. EDTA were added and stirred until dissolved. 6.03 g. ammonium meta vanadate ($NH_4VO_3$) were added and the mixture stirred. Little or no solution occurred until 50 ml. of 50% hydrazine hydrate/$H_2O$ solution were added and heated to boiling. The $NH_4VO_3$ then dissolved to form a pale green solution which rapidly changed to a deep brilliant blue. After 5 minutes of boiling and a brief cooling another 25 ml. 50% hydrazine hydrate solution were added and again boiled 5 minutes. This solution, diluted to 2550 ml. with boiling deionized water was used to impregnate the oven dried catalyst, again resulting in a uniform wetting. The product was dried for 24 hours at 110° C., passed through a 20 mesh screen and calcined, in a muffle, for 3 hours at 1050° F.

Sample 146 was prepared in the same manner as was sample 144, with the exception that the weights of reagents were adjusted to give other desired final nickel and vanadium contents. Again the impregnations were very uniform.

The above impregnations were done near the boiling point to avoid any increase in liquid volume due to heating during the drying steps which would result in a supernatant layer of liquid and consequent non-uniform deposition of the chelates.

Part of samples 144 and 146 were subjected to steam at a temperature of 1150° F. for 6 hours in a flow reactor. The low level poisoned catalyst contained 273 p.p.m. NiO and 538 p.p.m. $V_2O_5$; the middle level poisoned catalysts contained 646 p.p.m. NiO—1644 p.p.m. $V_2O_5$ (natural) and 680 p.p.m. NiO—1652 p.p.m. $V_2O_5$ (chelate); the high level poisoned catalysts contain 911 p.p.m. NiO—2654 p.p.m. $V_2O_5$ (natural) and 944 p.p.m. NiO—2705 p.p.m. $V_2O_5$ (chelate).

Each of the five samples was tested for catalytic activity by use in a catalytic cracking activity test unit.

The feedstock used throughout in this unit was a petroleum hydrocarbon feed having the following properties:

| | |
|---|---|
| Gravity, °API | 27.0 |
| 200 Ml. vac. dist.: | |
| IBP | 497 |
| 5% | [1] 597 |
| 95% | [1] 1022 |
| Carbon residue (Rams.) | 0.618 |
| Flash (COC), °F. | 340 |
| Pour | 95 |
| Viscosity: | |
| Kv./122° F., cs. | 20.12 |
| Kv./210° F., cs. | 5.213 |
| NiO, p.p.m. | 0.35 |
| $V_2O_5$, p.p.m. | 1.60 |
| Percent N | 0.09 |
| Percent C | 85.39 |
| Percent H | 13.06 |
| n-Pentane insol. | 0.266 |

[1] Below.

In the test unit catalyst circulation was established and temperatures throughout the unit set near test conditions of about 900° F. and atmospheric pressure. The catalyst beds were fluidized using nitrogen, and dispersion and stripping steam flows were established before oil feed was introduced. Air replaced nitrogen in the regenerator after oil feed was started. Each test was started after operations had been at test conditions long enough to have the unit, including the recovery system, in a steady state and after the catalyst had completed one cycle through the unit. Readings of feeds temperatures, pressures and gas make were taken each half hour. Catalyst circulation was measured and samples of the regenerated and spent catalyst were taken each hour (two-hour sample intervals for 8-hour tests). Samples of the stabilizer overhead gas were taken at the middle and end of the run. The composite flashpot bottoms and stabilizer bottoms were collected and weighed at the end of the run (2–8 hours long). Stabilizer bottoms were subsequently batch fractionated to test approximately 360° F. at 90% overhead on an ASTM distillation.

Table II gives a comparison of the cracking effects of a sample of the virgin base catalyst (134) and samples of this catalyst poisoned naturally (in a pilot plant) and artificially by the chelate method and poisoned by the chelate method and subsequently subjected to steam treatment. It is obvious from the table that the steam treated samples had a catalytic activity much more closely approaching that of the naturally poisoned samples, especially in the coke factors.

in its gas and coke-producing factors to a sample of the same catalyst naturally-poisoned to the same level of Ni content, when allowance was made for the additional misbehavior of the naturally-poisoned catalyst due to its vanadium content.

This application is a continuation-in-part of my copending application Serial No. 758,664, filed September 3, 1958, now abandoned.

I claim:

1. In a process for artificially poisoning a silica-based hydrocarbon cracking catalyst to closely simulate the poisoning effect of a contaminant present in a hydrocarbon feedstock containing a metal having an atomic number from 23 to 30 which metal poisons the cracking activity of the catalyst, the steps of impregnating the catalyst with a solution containing a decomposable organic oxygen-containing chelate of the said metal, subjecting the impregnated catalyst to an elevated temperature to decompose the said organic chelate, the amount of said solution providing a poisoning amount of metal and up to about 5000 p.p.m. of total metal on the catalyst, calcining the catalyst, and subjecting the calcined catalyst to steam at a temperature of about 750 to 1250° F. for about 1 to 10 hours.

2. The process of claim 1 in which the contaminant contains nickel.

3. The process of claim 1 in which the contaminant contains vanadium.

4. The process of claim 1 in which the solution is aqueous.

5. The process of claim 1 in which the organic oxygen-containing chelate of the metal is formed by ethylene diamine tetraacetic acid.

6. The process of claim 1 in which the contaminant contains nickel and vanadium.

7. The process of claim 1 where the steaming is performed at a temperature of about 1000 to 1200° F. for about 4 to 8 hours.

8. In a process for artificially poisoning a silica-based hydrocarbon cracking catalyst to closely simulate the poisoning effect of a contaminant present in a hydrocarbon fedstock containing a metal having an atomic number from 23 to 30 which metal poisons the cracking activity of the catalyst, the steps of impregnating the catalyst with a solution containing a decomposable amino polycarboxylic acid chelate of the said metal, subjecting the impregnated catalyst to an elevated temperature to decompose the said organic chelate, the amount of said solution providing a poisoning amount of metal and up to about 5000 p.p.m. of total metal on the catalyst, calcining the catalyst, and subjecting the calcined catalyst

TABLE II

| Sample | P.p.m. NiO | P.p.m. $V_2O_5$ | P.p.m. Total | Percent Conv. | Percent Gaso. | Percent Gas | Percent Coke | Gas Grav. | Poisoning Method |
|---|---|---|---|---|---|---|---|---|---|
| 134 | 273 | 538 | 811 | 34.6 | 24.1 | 8.7 | 1.8 | 1.19 | virgin. |
| 138 | 646 | 1,644 | 2,290 | 29.6 | 19.2 | 8.8 | 1.6 | 0.96 | natural. |
| 144 | 680 | 1,652 | 2,332 | 31.6 | 19.2 | 9.7 | 2.7 | 0.81 | chelate. |
| 144(S) | 680 | 1,652 | 2,332 | 28.8 | 19.2 | 7.7 | 1.9 | 0.83 | chelate+steam. |
| 139 | 911 | 2,654 | 3,565 | 27.0 | 17.2 | 7.6 | 2.2 | 0.75 | natural. |
| 146 | 944 | 2,705 | 3,649 | 28.2 | 17.2 | 8.2 | 2.8 | 0.65 | chelate. |
| 146(S) | 944 | 2,705 | 3,649 | 25.1 | 16.6 | 6.3 | 2.2 | 0.69 | chelate+steam. |

0.296 gram of acetylacetonate were dissolved in a small quantity of ethyl alcohol and further ethyl alcohol was added to bring the solution to 60 mls. To this solution 0.249 gram of nickel formate were added to produce a nickel acetylacetonate complex containing 21.1% nickel. 100 grams of silica-alumina equilibrium catalyst were added to this solution and absorbed all of the liquid. The wet mass was dried and calcined essentially as the chelate-poisoned catalysts reported above. This sample was then steam treated for 2 hours at 1075° F. and was found close to steam at a temperature of about 750 to 1250° F. for about 1 to 10 hours.

9. The method of claim 1 in which the solution provides up to about 1500 p.p.m. of said metal on the catalyst.

10. The method of claim 8 in which the solution provides up to about 1500 p.p.m. of said metal on the catalyst.

11. A method for testing the effects on a silica-based cracking catalyst of a metal contaminant of atomic number from 23 to 30 which metal poisons the cracking activity of the catalyst which consists essentially of artificially poisoning a silica-based hydrocarbon cracking catalyst to closely simulate the poisoning effect of said metal as a contaminant present in hydrocarbon feedstock by impregnating the catalyst with a solution containing a decomposable organic oxygen-containing chelate of the said metal, the amount of said solution providing a poisoning amount of metal and up to about 5000 p.p.m. of total metal on the catalyst, subjecting the impregnated catalyst to an elevated temperature to decompose the said organic chelate, calcining the catalyst, subjecting the calcined catalyst to steam at a temperature of about 750 to 1250° F. for about 1 to 10 hours, and cracking a normally liquid hydrocarbon feedstock without substantial addition of free hydrogen while obtaining gasoline as a product while using said impregnated silica-based catalyst.

12. The method of claim 11 in which the contaminant contains nickel.

13. The method of claim 11 in which the contaminant contains vanadium.

14. The method of claim 11 in which the organic oxygen-containing chelate of the metal is formed by ethylene diamine tetraacetic acid.

15. The method of claim 11 in which the contaminant contains nickel and vanadium.

16. The method of claim 11 where the steaming is performed at a temperature of about 1000 to 1200° F. for about 4 to 8 hours.

17. The method of claim 11 in which the solution provides up to about 1500 p.p.m. of said metal on the catalyst.

References Cited in the file of this patent

UNITED STATES PATENTS

| | | |
|---|---|---|
| 1,914,557 | Carver | June 20, 1933 |
| 2,273,298 | Szayna | Feb. 17, 1942 |
| 2,375,757 | Bates | May 15, 1945 |
| 2,767,148 | Plank | Oct. 16, 1956 |
| 2,889,287 | Scott | June 2, 1959 |
| 2,897,246 | Keizer et al. | July 28, 1959 |
| 2,906,792 | Kilpatrick | Sept. 29, 1959 |
| 2,913,394 | Kimberlin et al. | Nov. 17, 1959 |
| 2,941,936 | Harper | June 21, 1960 |